US007014171B2

(12) United States Patent
Radke

(10) Patent No.: US 7,014,171 B2
(45) Date of Patent: Mar. 21, 2006

(54) TIE LIFTER AND HOLDER

(76) Inventor: Albert James Radke Radke, 1100 G. St., Fairmont, NE (US) 68354-9612

( * ) Notice: Subject to any disclaimer, the term of this patent is extended or adjusted under 35 U.S.C. 154(b) by 145 days.

(21) Appl. No.: 10/196,694

(22) Filed: Jul. 15, 2002

(65) Prior Publication Data

US 2004/0007698 A1 Jan. 15, 2004

(51) Int. Cl.
*B65G 7/02* (2006.01)
*E01B 29/02* (2006.01)

(52) U.S. Cl. ........................ 254/121; 254/131; 254/43; 254/44; 294/17; 294/117; 294/118

(58) Field of Classification Search ............... 52/122.1, 52/124.2, 125.1, 125.2, 125.6, 126.1, 123.1, 52/127.2, 127.5, 127.7, 698, DIG. 1; 81/488, 81/52, 53.1, 467; 254/121–132, 43–44; 294/117–118, 294/17
See application file for complete search history.

(56) References Cited

U.S. PATENT DOCUMENTS

| | | | | | |
|---|---|---|---|---|---|
| 124,749 | A | | 3/1872 | Koontz | 294/17 |
| 795,195 | A | * | 7/1905 | Comi | 254/121 |
| 802,588 | A | * | 10/1905 | Parks et al. | 254/121 |
| 907,034 | A | | 12/1908 | Gracey | 294/17 |
| 978,618 | A | | 12/1910 | Moore | 254/121 |
| 982,401 | A | * | 1/1911 | Warthen | 254/43 |
| 1,048,163 | A | * | 12/1912 | Hoover et al. | 254/121 |
| 1,131,051 | A | * | 3/1915 | Gagnon | 294/15 |
| 1,252,249 | A | * | 1/1918 | De Long | 254/121 |
| 1,297,453 | A | | 3/1919 | Emmons et al. | 254/121 |
| 1,317,145 | A | | 9/1919 | Skantz | 254/120 |
| 1,389,393 | A | | 8/1921 | Stolle | 254/43 |
| 1,590,145 | A | | 6/1926 | Wright | 254/121 |
| 1,695,660 | A | | 12/1928 | Major et al. | 254/121 |
| 1,814,901 | A | * | 7/1931 | Dickson | 254/121 |
| 2,156,735 | A | | 5/1939 | Packer | 254/121 |
| 2,304,752 | A | * | 12/1942 | Kirkland | 254/121 |
| 2,837,313 | A | | 6/1958 | Rogowski | 254/121 |
| 2,846,259 | A | | 8/1958 | Sadler | 254/131 |
| 2,923,252 | A | * | 2/1960 | Rogowski | 104/2 |
| 3,175,253 | A | * | 3/1965 | Xanten | 52/739.1 |
| 5,165,661 | A | | 11/1992 | Wright | 254/131 |
| 5,483,746 | A | * | 1/1996 | Beyers | 30/229 |
| 5,833,430 | A | * | 11/1998 | Reynolds et al. | 414/11 |
| 5,907,940 | A | * | 6/1999 | Eddie | 52/745.05 |
| 6,029,407 | A | * | 2/2000 | Schillero, Jr. | 52/127.2 |
| 6,055,730 | A | * | 5/2000 | Burke | 29/897.3 |
| 6,209,936 | B1 | | 4/2001 | Radke | 254/121 |

FOREIGN PATENT DOCUMENTS

| | | | |
|---|---|---|---|
| FI | 27121 | 1/1955 | 254/120 |

* cited by examiner

*Primary Examiner*—Jeanette E. Chapman

(57) ABSTRACT

An improved design that would allow one workman to easily elevate a heavy concrete tie to the base of the rail and hold it in position while tie is connected to the rail with retainer clips. Improvements are made in the handle design that allow the workman to remain in a more upright position at the time the tie comes in contact with the rail. Also added is a safety grip ring near the upper end of the handle. Design improvements are also made at the foot end of the handle unit. At this point the improved tool design will allow more leverage to be applyed to the tie and a varity of hook devises to be used on lower end of tool, depending on what type of concrete tie is to be used.

2 Claims, 1 Drawing Sheet

TIE LIFTER AND HOLDER

IMPROVED TIE LIFTER AND HOLDER

Field of search

294/15–17,19.1,
294/26,82.1, 82.11;
254/43,44, 113,119–121,131
References Cited
U.S. Patent Documents

| | | | | |
|---|---|---|---|---|
| 907,034 | December 1908 | Gracey | 294 | 17 |
| 978,618 | December 1910 | Moore | 254 | 121 |
| 124,749 | March 1872 | Koontz | 294 | 17 |
| 1,297,453 | March 1919 | Emmons et al. | 254 | 121 |
| 1,317,145 | September 1919 | Skantz | 254 | 120 |
| 1,389,393 | August 1921 | Stolle | 254 | 43 |
| 1,590,145 | June 1926 | Wright | 254 | 121 |
| 1,695,660 | December 1928 | Major et al. | 254 | 121 |
| 2,156,735 | May 1939 | Packer | 254 | 121 |
| 2,837,313 | June 1958 | Rogowski | 254 | 121 |
| 2,846,259 | August 1958 | Sadler | 254 | 131 |
| 5,165,661 | November 1992 | Wright | 254 | 131 |
| 6,209,936 | April 2001 | Radke | 254 | 121 |

Foreign Patent Documents

| | | | | |
|---|---|---|---|---|
| 27,121 | January 1955 | Finland | 254 | 120 |

BACKGROUND OF THE INVENTION

The invention has reference to improvements in devices for elevating railway ties; in this case, concrete railway ties, and holding them in place, and in contact with the rail while such rail is being connected therewith, with retainer clips. The railway industry in recent years have been using concrete ties to replace the original wood ties and this has increased the weight of the ties two to three hundred percent, Concrete ties require new methods and new types of tools to handle them. Ref; U.S. Pat. No. 978,618 to J. T. Moore, U.S. Pat. No. 1,297,453 to E. B. Emmons and E. T. Johnson, U.S. Pat. No. 1,695,660 to W. W. Major et-al, U.S. Pat. No. 2,156,735 to C. F Packer, U.S. Pat. No. 2,837,313 to F. J. Rogowski. The formentiond prior art devices may have been suitable for lighter wood ties but when working with the new concrete ties there design would be unsafe and not practical to use. The object of the improvements is to design a handle and tie hook system whereas it is more adaptable for use with heavy concrete ties and at the same time safer and easer for the worker to use.

BRIEF SUMMARY OF THE INVENTION

The improved concrete tie lifting tool is designed to elevate and hold a heavy concrete tie in place while retainer clips are installed to connect the tie to the rail flange. Without departing from the spirit of the invention, let it be understood that the newly designed foot-handle unit, link chain and hook are necessary to safely elevate and hold a heavy concrete tie.

The advantages and objects of the improved tool will become easy to see from the following brief description of the drawings and understood when read in connection with the detailed description of the invention.

DETAILED DESCRIPTION OF THE INVENTION

Figure 1:
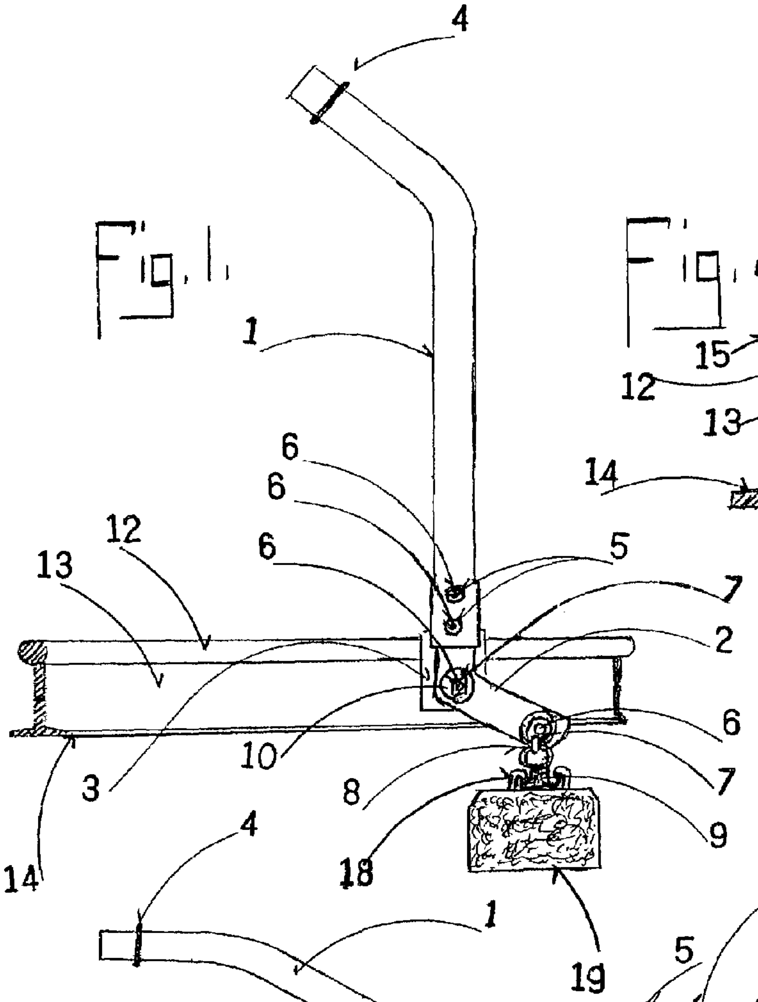
FIG. 1 Shows a side elevational view of the tool in the act of elevating a tie FIG. 2 Shows a side elevational view illustrating the tool in its active position FIG. 3 Shows a cross-section on the broken line x—x of FIG. 2
Figure 3:
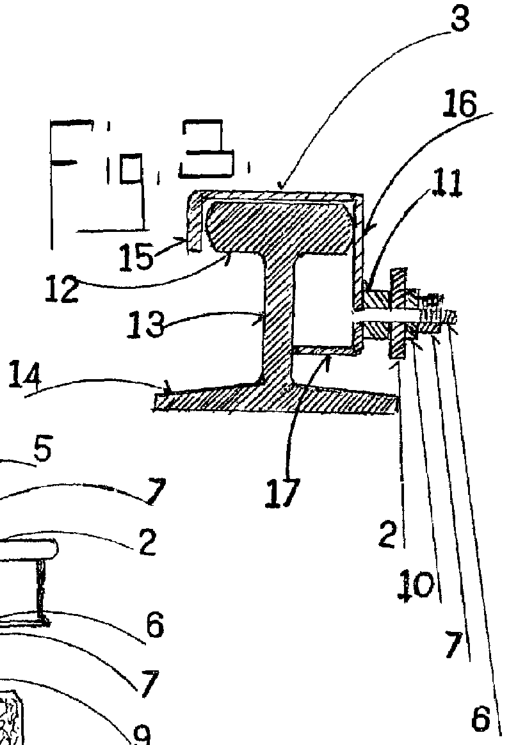
Figure 2:
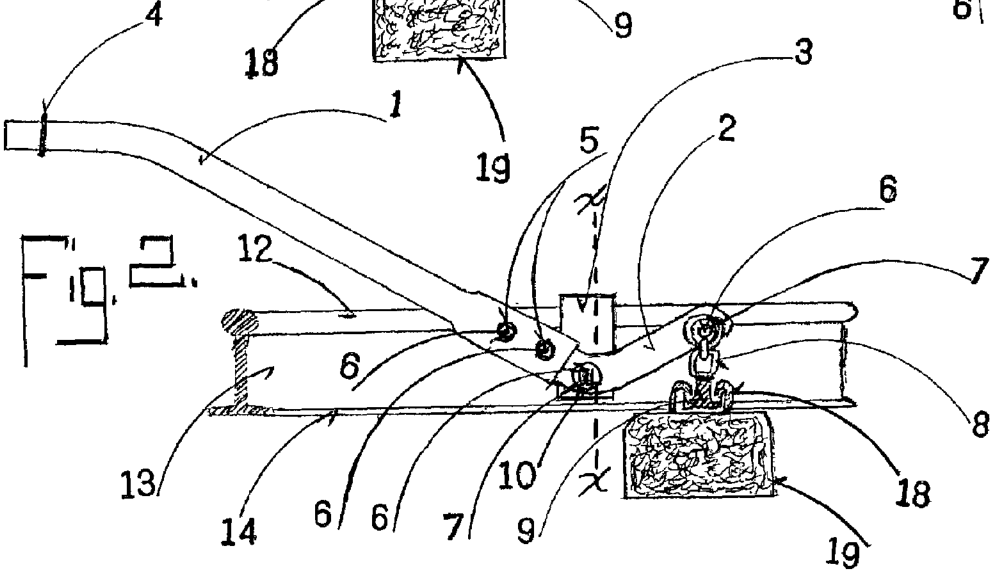

As seen in the drawings FIG. 1 is a design of a conventional rail of which consist of a rail head 12, a web 13 and a base or flange 14 by which it is secured in place. In FIG. 3 mounted on the rail is a bearing unit 3 having a downwardly projected support 16 at one side and a downwardly projected flange 15 on the oppsite side, the support 16 is provided with an inwardly turned flange 17 adapted to bear against the web 13. Shown in FIG. 1 is the connection of the lower end of the handle 1 and the upper end of the foot, 2 this connection is held together by two bolts 6 and two nuts 5 and forms the foot 2 handle 1 combination unit. In FIG. 3 it shows the foot 2 resting against the spacer 11 and support 16. The foot 2 is pivotally mounted to the bearing unit 3 with a single bolt 6 and washer 10 and is connected to bearing unit 6 with a nut 7. Referring to FIG. 2 a cant hook 9 is carried by an ambidextrous device, in this case a link chain 8 and is connected with a bolt 6 and a nut 7 to the forward end of the foot. 2 FIG. 1 when the tie 19 is at a downwardly position and when it is desired to elevate the tie 19 to engage the base or flange 14 of the rail the tool is then positioned on the rail, the foot end 2 is exetend down to a point just above the tie, 19 at this point the connecting chain 8 and the cant hook 9 will be in position to engage the clip retainer 18 and at this point the handle 1 will be in a somewhat to mostly vertical position depending on the distance that the tie 19 is below the rail flange 14.

DETAILED DESCRIPTION OF THE INVENTION

FIG. 2 upon pressure being brought to bear downwardly upon the upper handhold end of the handle 1 the force thereof FIG. 3 causes the flange 17 to tightly engage the face of the web 13 and flange 15 to similarly engage the edge of the rail, whereby the bearing 3 is held tightly in place, providing a rigid point of support for the foot-handle unit 2 and 1. Notice should be taken that even when the tie 19 is elevated to it's most elevated position FIG. 2 the upper end of the handle 1 with the safety grip ring 4 is still a safe and comfortable position well above the rail for the safety and comfort of the worker. Also somewhere between FIG. 1 and FIG. 2 if a tie is out of line or needs to be moved for or aft parallel with the rail it can be accomplished by moving the tool forward or backward on the rail before elevating the tie. The improvements in this tool are designed so no more than one person can us this tool at one time.

OBJECTS OF THE INVENTION

1. Handle unit
2. Foot
3. Bearing support unit
4. Safety grip ring
5. Nuts
6. Bolts
7. Nuts
8. Link chain
9. Cant hook
10. Washer

11. Spacer
12. Rail head
13. Rail web
14. Rail flange
15. Bearing flange
16. Bearing support
17. Bearing flange
18. Clip retainer
19. Tie

I claim:

1. A method of moving a concrete tie situated beneath a rail comprising the steps of:

(a) securing a tool to said concrete tie, said tool comprising a lever having a first end and a second end, said lever being pivotally attached to a bearing member, and said second end of said lever being attached to a securing device, said securing device comprising means to secure said tool to said concrete tie wherein said securing device comprises a chain having a first end and second end, said first end and a second end, said first end of the chain being attached to the said second end of said lever and said second end of said chain being attached to a hook capable of attachment to a concrete tie;

placing the bearing member on the upper surface of the rail;

wherein providing said bearing member also comprises providing a planar member, a first flange extending downward form said planar member along the distal side of said rail, a second flange extending downward from said planar member along the proximal side of said rail, and a third flange extending from said second flange beneath said rail in a parallel orientation to said planar member;

pivotally attaching said lever to said second flange applying force to the first end of the lever causing said third flange to engage the web of the rail and causing the bearing member to be held in position on the rail by tension created between the rail and the bearing member.

2. A tool for moving a concrete tie situated beneath a rail comprising:

(a) a lever having a first end and a second end;

(b) a bearing member comprising a planar member, a first flange extending downward from said planar member along the distal side of said rail, a second flange extending downward from said planar member along the proximal side of said rail, and a third flange extending from said second flange underneath said rail towards the web of said rail in a parallel orientation to said planar member, wherein said lever is pivotally attached to said second flange; and (c) a securing device comprising a chain having a first end and a second end, said first end of said chain being attached to said second end of said lever and said second end of said chain being attached to a hook capable of attachment to a concrete tie;

wherein the application of force to said first end of said lever causes said third flange to engage said web of said rail, thereby causing said bearing member to be held in position on said rail by tension created therebetween, and further causing said concrete tie to be moved.

* * * * *